(No Model.)
H. BENDER.
FORCE PUMP.
No. 524,237. Patented Aug. 7, 1894.
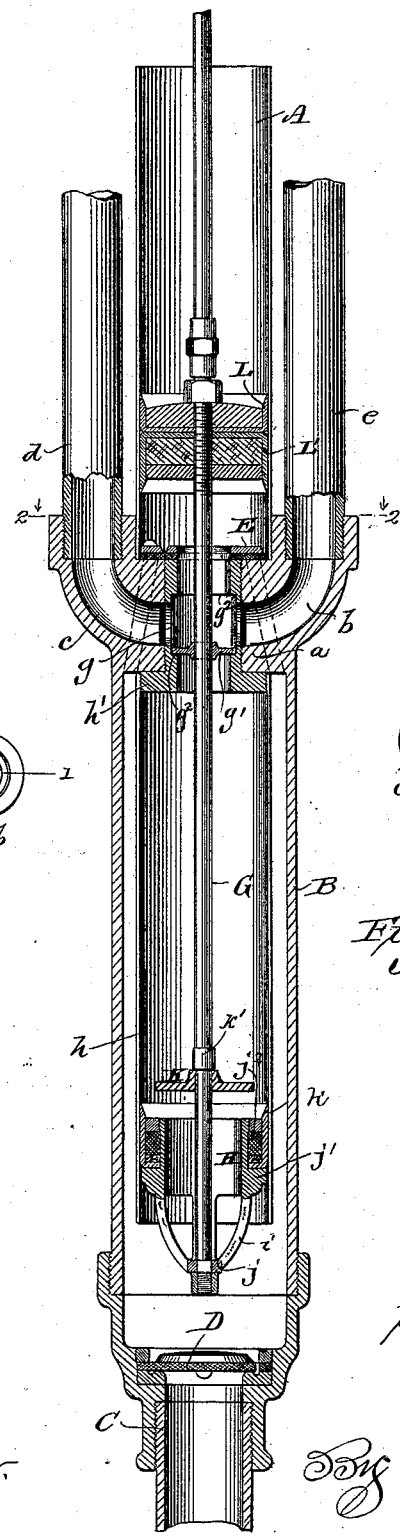
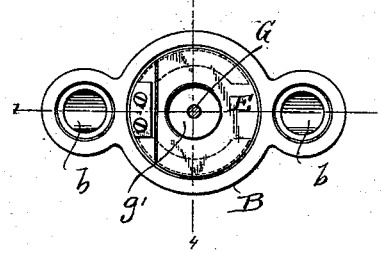
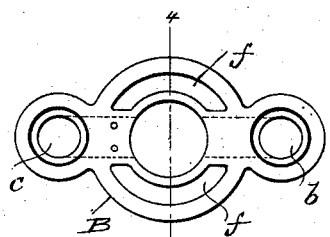
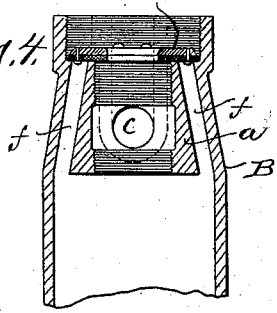
Witnesses.
Geo. W. Lowry,
A. W. Bender.
Inventor
Hiram Bender
By John E. Wiles.
Attorney

UNITED STATES PATENT OFFICE.

HIRAM BENDER, OF MILWAUKEE, WISCONSIN.

FORCE-PUMP.

SPECIFICATION forming part of Letters Patent No. 524,237, dated August 7, 1894.

Application filed May 12, 1893. Serial No. 474,012. (No model.)

*To all whom it may concern:*

Be it known that I, HIRAM BENDER, a citizen of the United States, residing at Milwaukee, county of Milwaukee, State of Wisconsin, have invented a certain new and useful Improvement in Force-Pumps; and I declare the following to be a full, clear, and exact description of the invention, such as will enable others skilled in the art to which it pertains to make and use the same, reference being had to the accompanying drawings, which form a part of this specification.

My invention relates to new and useful improvements in force pumps, and consists in the matters hereinafter described and pointed out in the appended claims.

In the accompanying drawings illustrating my invention Figure 1. is a central vertical sectional view of my improved force pump, taken on line 1—1 of Fig. 2. Fig. 2. is a horizontal sectional view of the same taken on line 2—2 of Fig. 1. Fig. 3. is a similar view illustrating the valve removed. Fig. 4. is a detail vertical sectional view taken on line 4—4 of Fig. 2.

The object of my invention is to provide a double acting force pump in which two cylinders are arranged end to end, and a single piston rod is arranged to extend longitudinally through said cylinders and carries two pistons, one in each cylinder, and the arrangement of the parts being such that as the piston rod is moved in either direction, one cylinder will be filling and the other cylinder will be discharging its contents.

To this end, A represents the upper one of the cylinders which is secured at its lower end to the upper end of a suitable tubular casing B, being conveniently screw-threaded at its lower end and engaged within a screw-threaded socket in the end of said casing as shown in Fig. 1.

C designates the suction pipe which is screw-threaded into the lower end of the casing B, and D a valve at the upper end of said suction pipe, which valve may be of any desired or convenient construction. A second valve E is arranged in the lower end of the upper cylinder A, and is provided with a central aperture as shown through which the piston rod plays, said valve being arranged to normally close the upper ends of two segmental ducts $ff$ which extend upwardly from the upper part of the casing B into the lower end of the cylinder A. A suitable head $a$ is provided in the upper end of the casing B, as shown in Fig. 1, of the drawings, said head being provided with a central aperture or passage $g$ which registers with the aperture in the valve E, and from opposite sides of which outwardly and upwardly curving passages $b$ and $c$, respectively, are arranged to extend, said passages being arranged to communicate with pipes $e$ and $d$, respectively, which lead to an air chamber and a discharge spout in a familiar manner.

G designates the piston rod which extends lengthwise through the cylinders, and $h$ designates the lower cylinder which is arranged in alignment with the cylinder A and is conveniently supported in position concentrically within the casing B by having its upper end screw-threaded onto an annular ring or collar $h'$ which is in turn screw-threaded into the head $a$ of the casing B. At the lower end of the piston rod G, is secured an annular piston head H, which is connected with said piston rod by means of a suitable central hub $j$ having radial spider arms $i\ i$, conveniently made integral with the annular piston head and said hub.

An external annular flange or seat $j'$ is provided upon the head H, and a suitable packing $k$ of leather or other suitable material is secured to said flange or seat as illustrated in Fig. 1, a ring or washer $j^2$ of elastic material being conveniently arranged between the outside of the head H, and the inside of the annular packing $k$, and secured in place by means of a suitable retaining ring as shown.

Loosely mounted upon the rod G just above the head H, is an annular valve or ring K, which is arranged to normally close the opening in the said head, and is adapted to slide upon the said rod between a suitable collar or shoulder $k'$ and said head, so as to open and close said opening, as will be presently described.

Upon the rod G within the upper cylinder A, is arranged a suitable head L provided with a suitable packing L' as shown, this latter head being made devoid of apertures or passages for the water.

As illustrated, the arrangement of the cylinder h within the casing B, is such as to leave a space between the outside of said cylinder and the inside of said casing for the passage of water to the upper cylinder A, and the segmental ducts or passages $f\,f$ extend from said space into the lower end of said cylinder.

Loose upon the rod G, is a sliding valve $g'$ which is fitted within the passage $g$, and is arranged to move alternately into engagement with seats $g^2\,g^2$ respectively at the upper and lower ends of said passage, as will be presently described.

The operation of my improved pump is as follows: First, assuming that the parts are in the several relative positions illustrated in Fig. 1. of the drawings, in which condition, the piston rod and pistons are approaching the limit of their downward stroke, the upper cylinder A having been previously filled with water by the last upward stroke, it will be seen that the valves D, and E are closed against the passage of water, and that the downward pressure of the water in the cylinder A is operating to hold the valve $g'$ downwardly against the seat $g^2$ at the lower end of the passage $g$, while the valve K is raised by the water so as to permit the lower cylinder to fill. In this position of the parts, a free passage is afforded for the water in the upper cylinder, through the central opening in the valve E and the passage $g$ into the conduits or passages $b$ and $c$. As soon as the downward stroke of the piston rod and the pistons is completed, and the upward stroke is begun, the valve D, will be opened in an obvious manner for the admission of water to the casing B, while by the upward motion of the piston head L within the upper cylinder, water will be drawn upward into said cylinder through the ducts or passages $f\,f$, the valve E being raised by the water in an obvious manner. Simultaneously with the opening of valves D and E, the valve K will be closed against the escape of water by the downward pressure of the water within cylinder $h$, and as the piston rod and pistons begin to move up, the water will raise the valve $g'$ against the upper seat $g^2$ in an obvious manner, so as to afford a free passage for the water into the conduits or ducts $b\,c$. As before stated, one of these conduits, as for instance, that marked $b$, communicates with a suitable air tank or chamber, while the other leads to a suitable discharge spout, and it follows that after a few strokes of the pistons, the water being forced alike into the two conduits $b$ and $c$, will operate in a familiar manner to compress the air in said chamber so as to produce a steady flow of water from the discharge spout.

My improved force pump is exceedingly effective in its operation, while being at the same time simple in construction and compact and strong.

Having thus described my invention, what I claim as new, and desire to secure by Letters Patent of the United States, is—

1. A double action force-pump, comprising a pair of cylinders of equal diameter arranged end to end and in alignment with each other, a tubular casing surrounding one cylinder and communicating with a supply pipe, and so arranged as to provide an annular water-passage outside of said cylinder, and communicating at its other end with the inner end of the other cylinder, and the first mentioned cylinder communicating with said tubular casing adjacent to said supply pipe, a discharge chamber located between the adjacent ends of said cylinders, and communicating with both of the same, a piston rod extending lengthwise through said cylinders and carrying two piston heads, one in each cylinder, and a valve located in the supply pipe for preventing backward flow of water therethrough, substantially as described.

2. A double action force-pump, comprising a pair of cylinders of equal diameter, arranged end to end and in alignment with each other, an intermediate discharge chamber, communicating with adjacent ends of both cylinders, a valve in said chamber for preventing the flow of water from one cylinder to the other, a tubular casing surrounding one cylinder, and communicating with a supply pipe, and so arranged as to leave an annular water-passage outside of said cylinder, and communicating at its other end with the inner end of the other cylinder the first mentioned cylinder being arranged to open into said tubular casing adjacent to the supply pipe, a piston rod extending lengthwise through said cylinders, and carrying two piston heads, one in each cylinder, the piston head in the cylinder adjacent to the supply pipe being provided with a valve-controlled port, and the other head being made solid, and a check valve in the suction or supply pipe, for preventing backward flow of water therethrough, substantially as described.

3. A double action force-pump comprising a pair of cylinders of equal diameter arranged end to end and in alignment with each other, an intermediate discharge chamber located between the adjacent ends of said cylinder, a valve located in said chamber for preventing the flow of water from one cylinder to the other, the lower end of the lower cylinder communicating directly with a suction or supply pipe a tubular casing surrounding said lower cylinder and arranged so as to provide an annular water-passage outside of the same and communicating at its upper end, with the lower end of the upper cylinder, a piston rod extending longitudinally through said cylinders and provided with a valved piston in the lower cylinder and a solid piston in the upper cylinder, and a check valve for closing the communication between the upper end of said outer casing and the lower end of the upper cylinder, substantially as described.

In testimony whereof I sign this specification in the presence of two witnesses.

HIRAM BENDER.

Witnesses:
JOHN E. WILES,
A. N. BENDER.